US006978069B1

(12) United States Patent
Taylor et al.

(10) Patent No.: US 6,978,069 B1
(45) Date of Patent: Dec. 20, 2005

(54) POLYMER GUEST-HOST SYSTEMS AND POLYMER ELECTRO-OPTIC WAVEGUIDE SYSTEMS

(75) Inventors: Rebecca Ellen Taylor, San Carlos, CA (US); Richard Ronald Barto, Jr., Cupertino, CA (US); Wendell Douglas Eades, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 76 days.

(21) Appl. No.: 10/388,364

(22) Filed: Mar. 12, 2003

Related U.S. Application Data

(60) Provisional application No. 60/363,546, filed on Mar. 13, 2002.

(51) Int. Cl.[7] ............................. G02B 6/00; G02F 1/035
(52) U.S. Cl. ............................. 385/122; 385/2; 385/3; 385/141; 359/252; 359/279; 359/322; 252/583
(58) Field of Search .......................... 385/2, 3, 8, 122, 385/141; 359/252, 279, 321, 322; 252/583

(56) References Cited

U.S. PATENT DOCUMENTS

| | | | |
|---|---|---|---|
| 4,818,616 A * | 4/1989 | Milverton et al. ........ 428/411.1 |
| 5,290,630 A * | 3/1994 | Devonald et al. ............ 428/333 |
| 5,943,464 A * | 8/1999 | Khodja ........................ 385/122 |
| 6,067,186 A | 5/2000 | Dalton et al. ................ 359/321 |
| 6,090,332 A | 7/2000 | Marder et al. | |
| 6,126,867 A | 10/2000 | Kanitz et al. | |
| 6,174,961 B1 | 1/2001 | Kanitz et al. | |
| 6,194,120 B1 * | 2/2001 | Chan et al. ............... 430/270.1 |
| 6,228,977 B1 | 5/2001 | Kanitz et al. | |
| 6,229,047 B1 | 5/2001 | Glaser et al. | |
| 6,252,557 B1 | 6/2001 | Plugge et al. ................ 343/772 |
| 6,555,027 B2 * | 4/2003 | Wang et al. ................. 252/582 |
| 2004/0005105 A1 * | 1/2004 | Marks et al. ................... 385/2 |

FOREIGN PATENT DOCUMENTS

| WO | WO 00/09613 | 2/2000 |
| WO | WO 01/53746 A1 | 7/2001 |
| WO | WO 02/08215 A1 | 1/2002 |
| WO | WO 02/37173 A2 | 5/2002 |

OTHER PUBLICATIONS

Dalton et al., "The role of London forces in defining noncentrosymmetric order of high dipole moment-high hyperpolarizability chromophores in electrically poled polymetric thin films," *PNAS*, 94:4842-4847 (1997).

He et al., "Synthesis of Chromophores with Extremely High Electro-optic Activity. 1. Thiophene-Bridge-Based Chromophores," *Chemistry of Materials*, 14:4662-4668 (2002).

(Continued)

*Primary Examiner*—John D. Lee
*Assistant Examiner*—Daniel J. Petkovsek
(74) *Attorney, Agent, or Firm*—McDermott Will & Emery LLP

(57) ABSTRACT

An electro-optic system in accordance with an embodiment of the present invention comprises a high glass transition temperature (Tg≧about 210° C.) polymer matrix featuring aromatic groups on the backbone repeating unit, which hosts a guest, high hyperpolarizability organic NLO chromophore. Electro-optic systems according to embodiments of the present invention exhibit relatively high electro optical activity and low optical loss, and may exhibit optical stability at temperatures exceeding 70° C. Guest-host polymer systems in accordance with embodiments of the present invention may be formed into unique and appropriate shapes such as waveguides.

18 Claims, 8 Drawing Sheets

4B6M NLO DYE

OTHER PUBLICATIONS

Shi et al., "Low (Sub-1-Volt) Halfwave Voltage Polymeric Electro-optic Modulators Achieved by Controlling Chromophore Shape," *Science*, 288(5463):119-122 (2000).

Wang et al., "Design, Synthesis and Characterization of A Novel Substituted Dicyanomethylendihydrofuran Based High-β NLO Chromophore and Its Polymers with Exceptionally High Electro-Optic Coefficients," *Polym. Prepr.,* 39(2):1065-1066 (1998).

ATI 2001 d,e, Apec (PC-HT) Product Range, Reference Data, Processing Brochure by Bayer (2001).

Drenzer et al., Femtosecond, Frequency-Agile, Phase-Sensitive-Detected, Multi-Wave-Mixing Nonlinear Optical Spectroscopy Applied to ∫1-Electron Photonic Materials, J. Phys. Chem. A 1999, 103. pp. 2290-2301.

Ermer et al., Low-Voltage Electro-Optic Modulation using Amorphous Polycarbonate Host Material, in WDM and PHotyonic Switching Devices for Network Applications. Ray T. Chen, G. Ferris Lipscomb, Editors, Proceddings of PIE vol. 3949 (2000).

Oh et al., Recent Advances in Electrooptic Polymer Modulators Incorporationg Highly Nonlinear Chromophore, IEEE Journal on Selected Topics in Quantum Electronics, vol. 7, No. 5 Sep./Oct. 2001.

Robinson et al., The Molecular and Supramolecular Engineering of Polymeric Electro-Optic Materials, Chemical Physics 245 (1999), pp. 35-50.

Shi et al., Low Halfwave Voltage Electrooptic Polymer Modulators: design and fabrication, Part of the SPIE Conference on Second Order Organic Nonlinear Optics II, Denver, CO, Jul. 1999, SPIE, vol. 3796.

Steier et al., Polymer Electro-Optic Devices for Integrated Optics, Chemical Physics 245 (1999), pp. 487-506.

Zhang et al., Progress Toward Device-Quality Second-Order Nonlinear Optical Materials. 4. A Trilink High $\mu\beta$ NLO Chromosphore in Thermoset Polyuerathane: A "Guest-Host" Approach to Larger Electrooptic Coefficients, Macromolecules 2001, 34, 253-261.

\* cited by examiner

4B6M NLO DYE x > y

APEC POLYMER

46M NLO DYE x:y' < x:y
APC POLYMER

GE CO-BISPHENOL A-FLUORENONE BIS-PHENOL

GE RED CROSS BIS-PHENOL CARBONATE HOMOPOLYMER 1,3-BIS-HYDROXY-PHENYL-MONOTERPENE POLYCARBONATE

POLYMER GUEST-HOST SYSTEMS AND POLYMER ELECTRO-OPTIC WAVEGUIDE SYSTEMS

CROSS-REFERENCE TO RELATED APPLICATION(S)

The instant non-provisional patent application claims priority from U.S. provisional patent application No. 60/363,546, filed Mar. 13, 2002. This provisional patent application is incorporated by reference herein for all purposes.

BACKGROUND OF THE INVENTION

Many types of materials can be used to create electro-optic devices, which in general comprise chemical species having highly polarizable electrons. When an electric field is applied to these electro-optic materials, alteration in the electron polarization changes properties of the material, including, for example, changes in the index of refraction and velocity of light passing through the electro-optic material.

As part of the process for preparing the electro-optic materials for use in actual devices, a uniform electron polarization direction in the absence of an applied electromagnetic field must first be established by poling. In an electro-optic system comprising an electrically active material such as a chromophore (guest) fixed within a polymer (host), such uniform electron polarization alignment may gradually be lost over time due to a variety of relaxation processes attributed to the thermoplastic matrix. The rate at which such relaxation processes occur is typically temperature-dependent. For many such chromophore/polymer (guest/host) electro-optic systems, even a modest increase over room temperature can cause sufficient relaxation to eliminate desired uniformity in the polarization of the guest chromophore molecule.

Therefore, there is a need in the art for polymer based electro-optic systems which retain the uniform electron polarization resulting from poling to as high a temperature as possible.

BRIEF SUMMARY OF THE INVENTION

An electro-optic system in accordance with an embodiment of the present invention comprises a high glass transition temperature (greater than about 210° C.) polymer matrix featuring aromatic groups on the backbone repeating unit, which hosts a guest, high hyperpolarizability organic NLO chromophore. Electro-optic systems according to embodiments of the present invention exhibit relatively high electro optical activity and low optical loss, and may exhibit optical stability at temperatures exceeding 70° C. Guest-host polymer systems in accordance with embodiments of the present invention may be formed into unique and appropriate shapes such as waveguides.

An embodiment of an organic chromophore according to the present invention comprises a non-linear optical (NLO) dye in a polymer matrix including an aromatic group as a repeating backbone unit, the polymer matrix having a glass transition temperature of 210° C. or greater.

An embodiment of a modulator device in accordance with the present invention comprises a combination of phase and amplitude modulators formed from high hyperpolarizability organic chromophores of an NLO dye in a polymer matrix including an aromatic group as a repeating backbone unit, the polymer matrix having a glass transition temperature of 210° C. or greater, said modulator being configured to perform signal processing.

An embodiment of a method of preparing a guest-host system in accordance with the present invention comprises mixing a non-linear optical dye with a polymer matrix including an aromatic group as a repeating backbone unit, the polymer matrix having a glass transition temperature of 210° C. or greater. The mixture is heated above the glass transition temperature while applying a electromagnetic field to uniformly orient the dye. The mixture is then cooled to below the glass transition temperature while continuing to apply the electro magnetic field.

These and other embodiments of the present invention, as well as its features and some potential advantages are described in more detail in conjunction with the text below and attached figures.

DETAILED DESCRIPTION OF THE INVENTION

Embodiments in accordance with the present invention relate to a group of high hyperpolarizability organic chromophores and processes for making and using the same. The electro-optic system has at least one organic substituent which demonstrates electro-optic activity. Embodiments in accordance with the present invention provide a new level of performance of polymeric electro-optic modulators demonstrating optical nonlinearity desirable thermal and chemical stability and low absorption loss. The electro-optic materials may also be formed in unique and appropriate shapes.

It has been found that polymer guest-host systems using a novel dye and amorphous polycarbonate or APC polymer matrix creates a desirable electro-optic material. In part the materials found have high electro-optic activity, low optical loss, and high thermal stability and have uses in numerous electro-optic and photonic devices, including, but not limited to Mach Zehnder modulators, optical switches, variable optical attenuators, narrowband notch and bandpass filters, digitally tuned gratings, optical frequency mixers and sensor array antennae, including the sampler array antenna whose design is described in co-assigned U.S. Pat. No. 6,252,557, which is incorporated by reference herein for all purposes.

Figure 5:
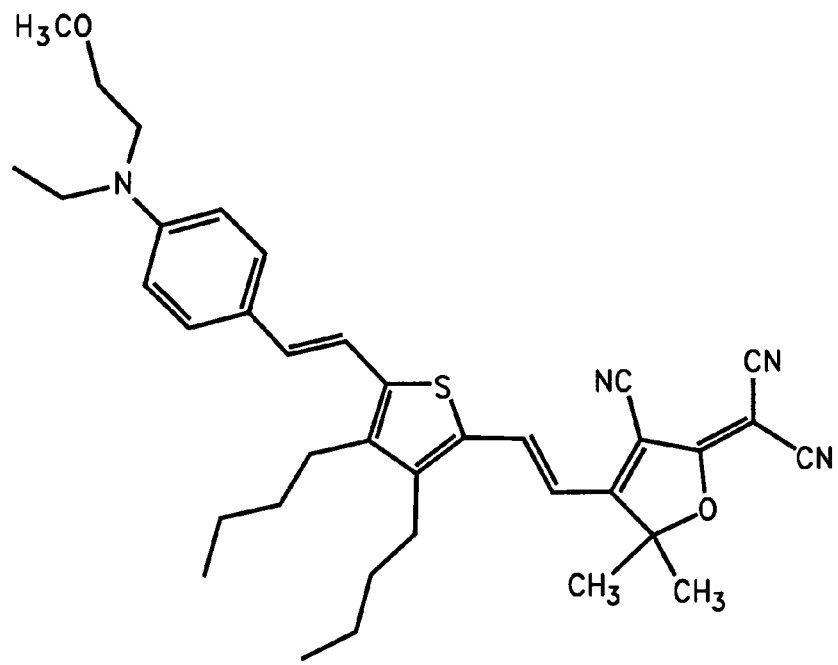
FIG. 5 shows the chemical structure of a NLO dye component of a guest-host system in accordance with one embodiment of the present invention.

In one specific embodiment, a non-linear optical (NLO) polymer guest-host system is provided for use in electro-optic waveguide systems. In this embodiment, the specific NLO chromophore employed comprises the 4B6M NLO dye having the chemical structure shown in FIG. 5. One chemical name for this dye is [4-[2-[5-[2-[4-[ethyl-2-methoxyethylamino] phenyl]ethenyl]-3,4-dibutyl-2-thienyl]ethenyl]-3-cyano-5,5-dimethyl-2(5H)-furanylidene]propanedinitrile. A synonym chemical name for this dye is 2-(3-cyano-4-{2-[5-(2-{4-[ethyl-(2-methoxyethyl)amino]phenyl}vinyl)-3,4-dibutylthiophen-2-yl]vinyl}-5,5-dimethyl-5H-furan-2-ylidene)malononitrile.

The 4B6M NLO dye is the end product of the Wittig reaction of 4-(2-methoxyethylethyamino)benzyltriphenyl phosphonium iodide with 3,4-dibutylthiophene-2-carboxaldehyde to form a coupled product. Subsequent reaction of the coupled aldehyde product with 2-dicyanomethylene-3-cyano-4,5,5-trimethyl-2,5-dihydrofuran, and FTC acceptor, yields the 4B6M NLO dye structure.

Figure 6:
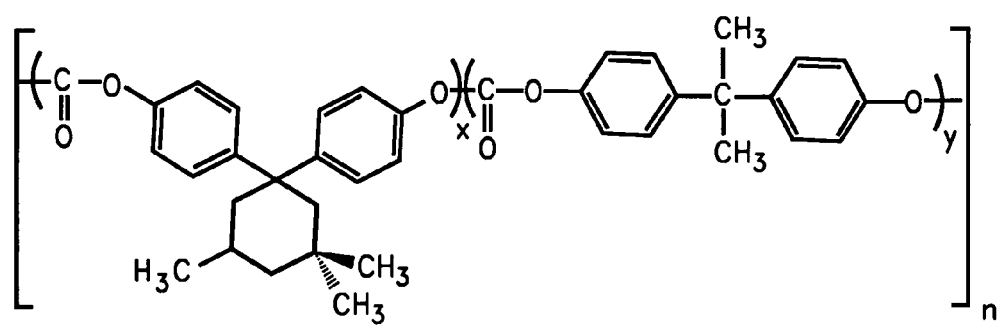
FIG. 6 shows the chemical structure of a polycarbonate host component of a guest-host system in accordance with one embodiment of the present invention.

The polymer component of the electro-optic system in accordance with this embodiment of the present invention comprises an amorphous polycarbonate having a relatively high glass transition temperature (Tg) of 219° C., for example, the amorphous poly[bisphenol A carbonate-co-4,4'-(3,3,5-trimethylcyclohexylidene)diphenol carbonate] (APEC 9389) having the chemical structure is shown in FIG. 6, is commercially available from Bayer AG of Leverkusen Germany.

This APEC 9389 amorphous polycarbonate possesses a basic chemical structure similar to other amorphous polycarbonates, but demonstrates a higher glass transition temperature. The reason for the elevated Tg of APEC 9389 relative to other polycarbonates is not known with certainty, but may be due to a higher content of repeating monomer units (x) shown in the polymer structure of FIG. 6.

Embodiments in accordance with the present invention offer a number of advantages over conventional cross-linked polymer systems. One advantage is enhanced temperature stability. The electro-optic system shown and described above demonstrates long term orientational stability at temperatures of at least 70° C.

Figure 1:
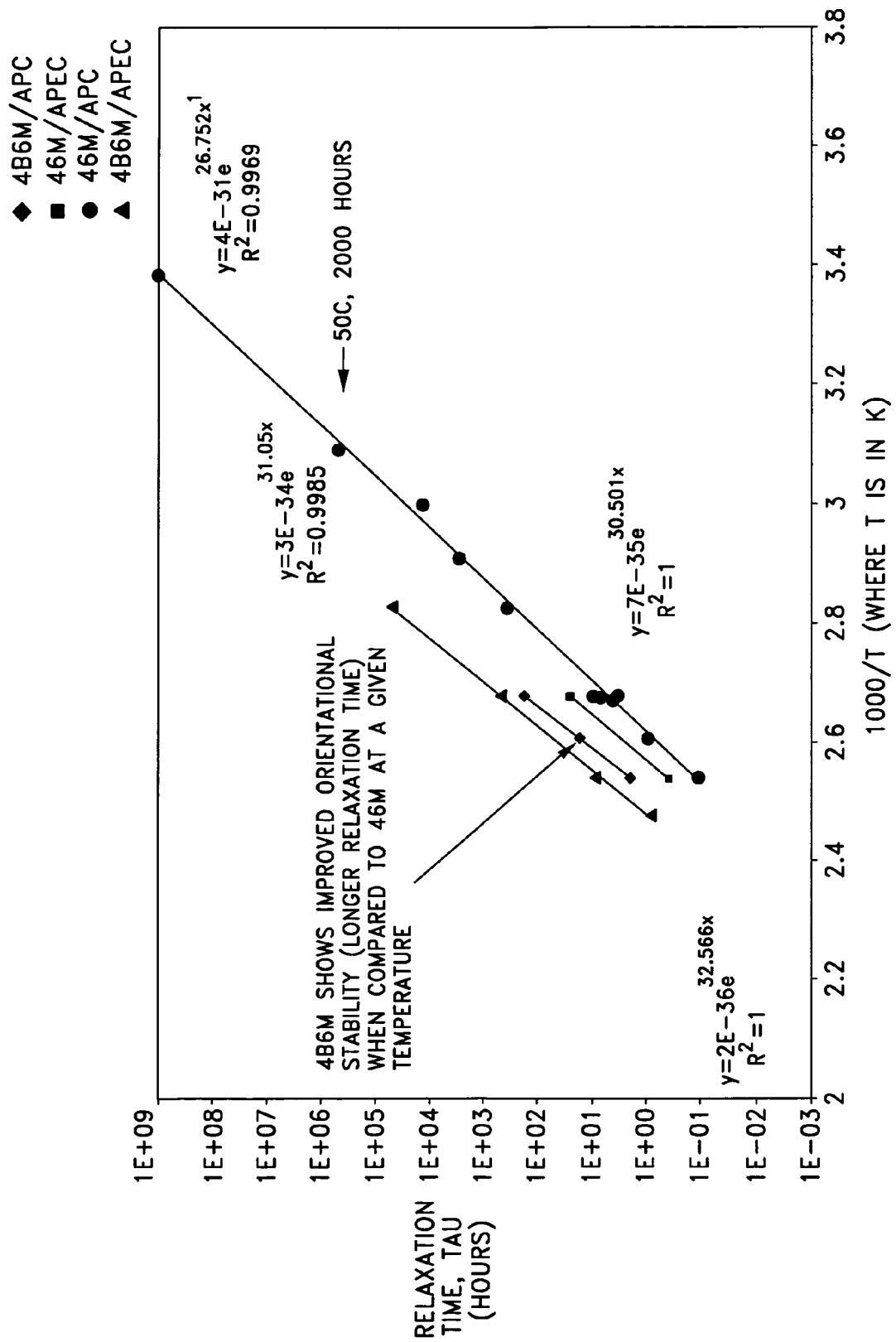
FIG. 1 is an Arrhenius plot of relaxation time for a number of electro-optic guest-host systems.
Figure 7:
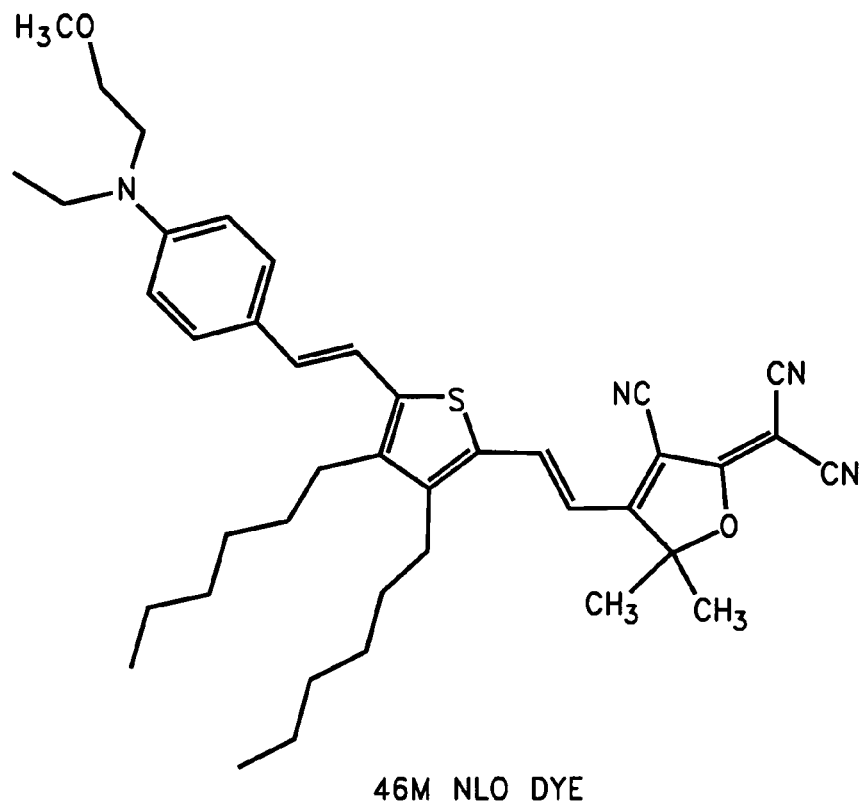
FIG. 7 shows the chemical structure of a NLO dye guest component of a guest-host system in accordance with an alternative embodiment of the present invention.
Figure 8:
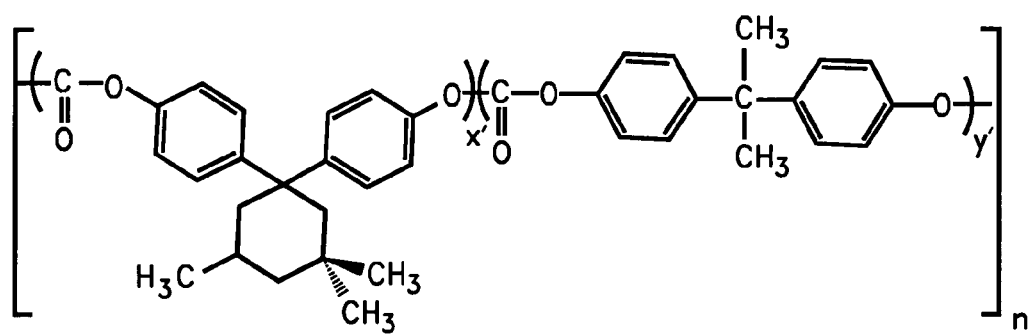
FIG. 8 shows the chemical structure of a polycarbonate host component of a guest-host system in accordance with an alternative embodiment of the present invention.

The favorable temperature stability property of several specific embodiments of the guest-host polymer systems just described, is illustrated in FIG. 1. FIG. 1 is an Arrhenius plot of relaxation time for a number of electro-optic systems. Certain of the guest-host polymer systems whose activity is plotted in FIG. 1 utilize the APEC polymer host and 4B6M NLO chromophore guest whose chemical structures are shown above. Other of the guest-host polymer systems whose activity is plotted in FIG. 1 utilize the 46M NLO chromophore guest and APC polymer host whose chemical structures are shown in FIGS. 7 and 8, respectively. One chemical name for the 46M dye is [4-[2-[5-[2-[4-[ethyl-2-methoxyethylamino] phenyl]ethenyl]-3,4-dihexyl-2-thienyl]ethenyl]-3-cyano-5,5-dimethyl-2(5H)-furanylidene] propanedinitrile. A synonym chemical name for this dye is 2-(3-cyano-4-{2-[5-(2-{4-[ethyl-(2-methoxyethyl)amino]phenyl}vinyl)-3,4-dihexylthiophen-2-yl]vinyl}-5,5-dimethyl-5H-furan-2-ylidene)malononitrile.

FIG. 1 shows that the guest-host system in accordance with an embodiment of the present invention comprising the 4B6M NLO chromophore within the APEC amorphous polycarbonate exhibited the longest relaxation times over the temperature range indicated. The system comprising the 4B6M chromophore within the APC amorphous polycarbonate polymer exhibited the next-best temperature stability. The system comprising the 46M chromophore within the APEC amorphous polycarbonate exhibited greater temperature stability than the 46M/APC system.

Figure 2:
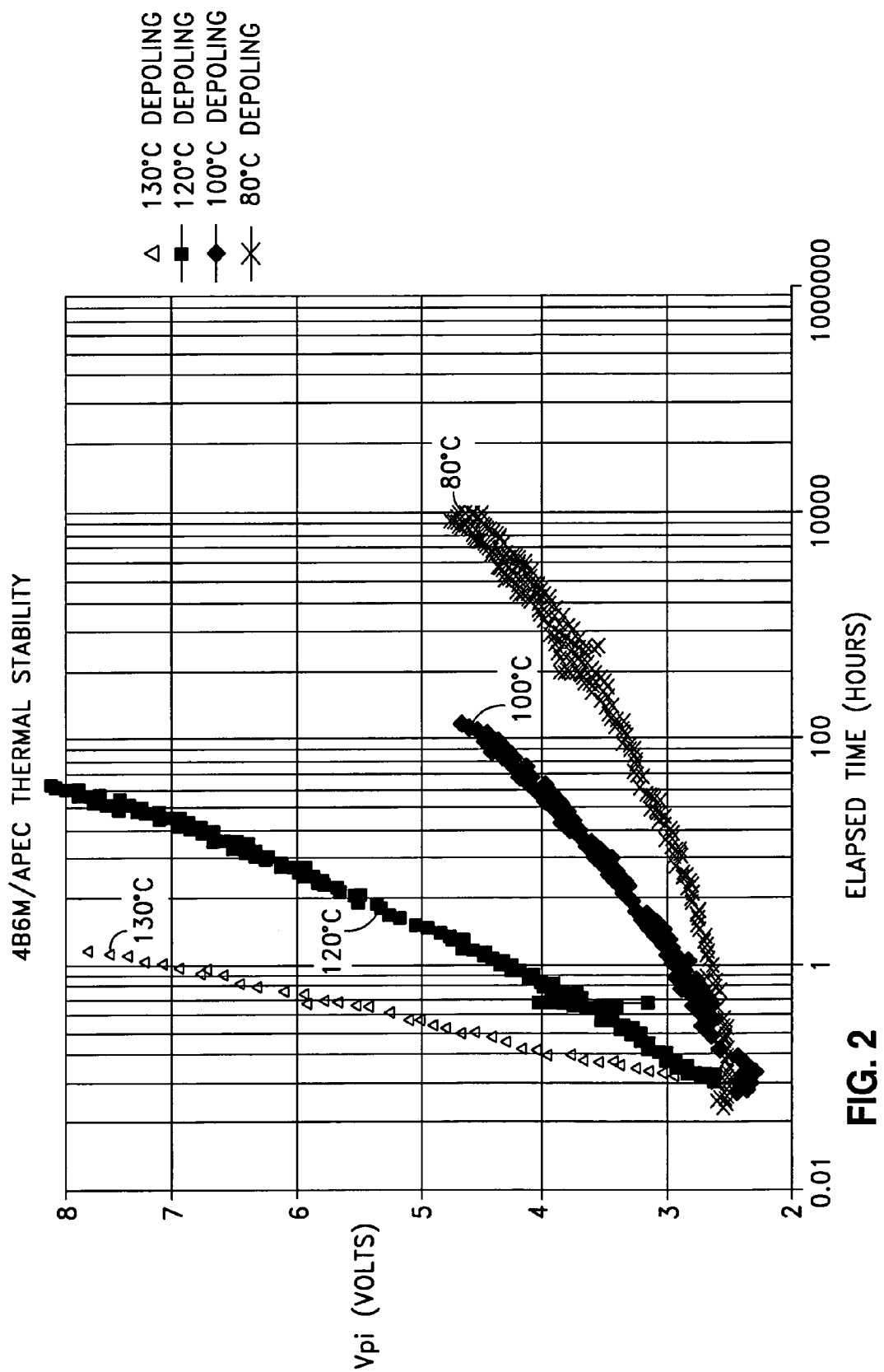
FIG. 2 plots switching voltage versus elapsed time for an electro-optic system in accordance with an embodiment of the present invention.
Figure 3:
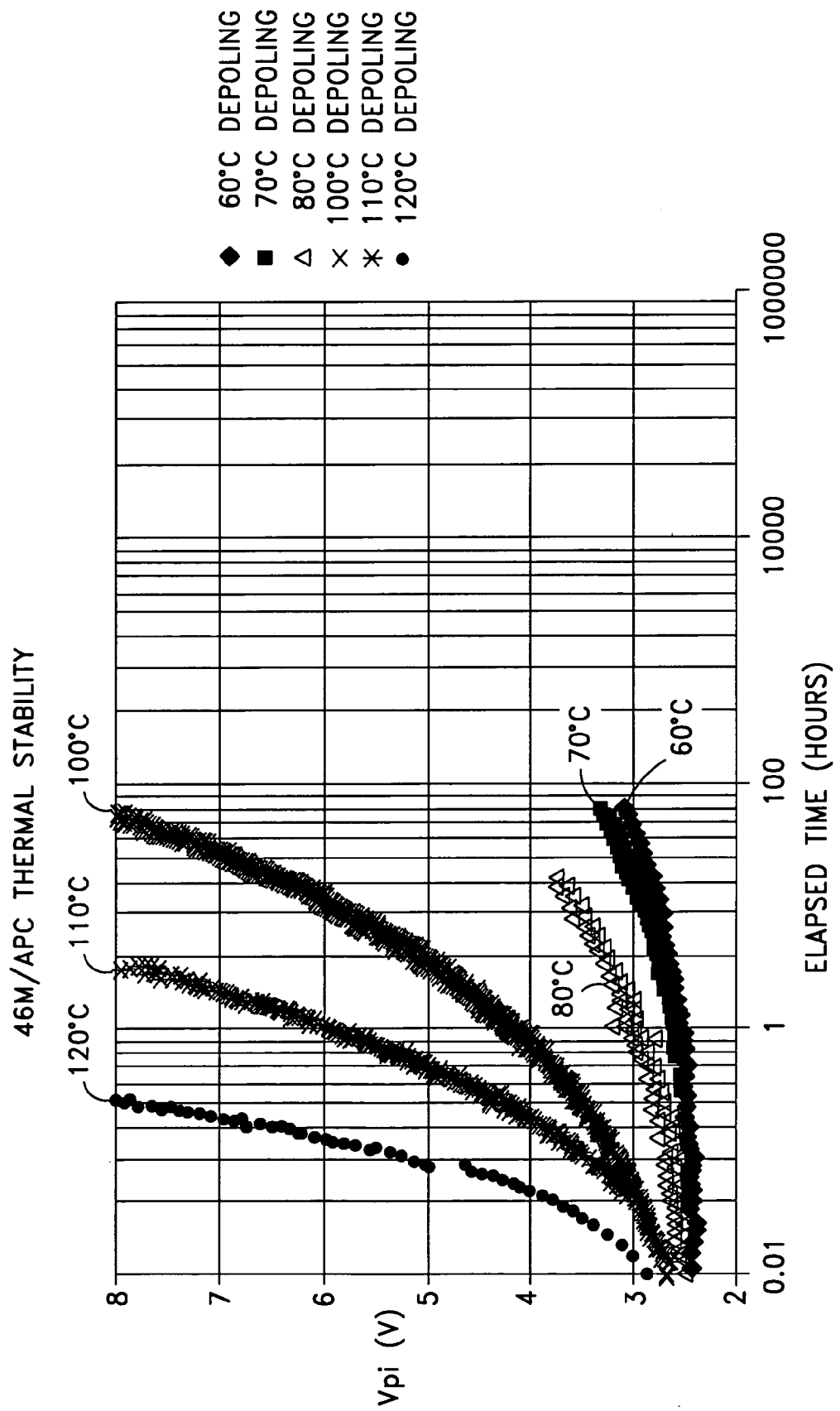
FIG. 3 plots switching voltage versus elapsed time for an electro-optic system in accordance with an alternative embodiment of the present invention.

The temperature stability of the 4B6M/APEC guest-host system in accordance with an embodiment of the present invention is further evidenced in FIGS. 2–3. FIG. 2 plots half-wave or switching voltage (Vpi) versus time that the 4B6M/APEC guest-host system is held at a particular temperature. Vpi represents the voltage necessary to change index of refraction on one arm of the modulator corresponding to a 180° phase shift in the optical mode relative to the parallel (unmodulated) arm, thereby resulting in optical extinction at the device output.

FIG. 3 plots Vpi versus time that the 46M/APC guest-host system is held at a variety of different temperatures. Comparison of FIGS. 2 and 3 shows that the 4B6M/APEC system exhibited superior thermal stability relative to the 46M/APC system. The following TABLE compares Vpi at different temperature/elapsed time combinations.

TABLE

| TEMP. (° C.) | GUEST-HOST SYSTEM | Vpi (V) | | | | |
|---|---|---|---|---|---|---|
| | | @ 0.5 hr | @ 1.0 hr | @ 50 hr | @ 100 hr | @ 500 hr |
| 80 | 46M/APC | 2.7 | 3 | 4.1 | 4.5 | 6.5 (proj.) |
| | 4B6M/APEC | 2.5 | 2.7 | 3.1 | 3.3 | 4.5 |
| 100 | 46M/APC | 3.5 | 4.1 | 7 | 8.4 | N/A |
| | 4B6M/APEC | 2.7 | 2.9 | 4 | 4.5 | 6.2 |
| 120 | 46M/APC | 8 | 13 (proj.) | N/A | N/A | N/A |
| | 4B6M/APEC | 3.2 | 4.1 | 7.1 | 8.5 | 15 (proj.) |

FIGS. 2 and 3 and this TABLE show that while both guest-host systems initially exhibited similar Vpi's, over time the Vpi of the 46M/APC system increased at a much larger rate than the Vpi of the 4B6M/APEC system. This increase in Vpi indicates a reduction in temperature stability of the system over time.

One metric of thermal stability is the temperature at or below which the guest host system Vpi will increase less than two-fold over a period of ten years. For the 4B6M/APEC system just described, this temperature is about 71° C. For the 46M/APC system, this temperature is about 71° C. For the guest-host system comprising the 46M chromophore hosted by the APEC polymer, this temperature is about 60° C.

The improved thermal stability of the particular embodiment of the present invention shown and described above in connection with FIGS. 1–3 may be a result of utilizing an amorphous polycarbonate incorporating monomer units with bulky substituents. This improved thermal stability also may be a result of utilizing a NLO chromophore designed for orientational stability. The chromophore having a dialkyl side chain of four carbons per alkyl group represents an optimum structure in preventing chromophore dipole—dipole interactions through steric hindrance and solubility, while impeding rotational degrees of freedom in the glassy polymer matrix at elevated temperatures.

Another advantage offered by embodiments in accordance with the present invention is high optical activity. Specifically, the particular embodiment of an electro-optic guest/host system shown and described above creates an optically active material having potentially high activity, such as an electro-optic coefficient ($r_{33}$) of 76 pm/V, compared to an electro-optic coefficient ($r_{33}$) of 30 pm/V for lithium niobate.

Still another advantage offered by embodiments in accordance with the present invention is low optical loss at telecommunications wavelengths. Specifically, use of the APEC 9389 amorphous polycarbonate prevents crystallization and haze, and therefore demonstrates low loss. Incorporation of a bulky cycloalkane substituent on one of the co-monomers disrupts the ability of the copolymer to establish long-range order resulting in crystallization. Such crystallization can undesirably cause scattering of light and create haze.

Yet another advantage offered by embodiments in accordance with the present invention is the ability to be processed into a hardened material lattice suitable for fabrication of a wave guide structure. The guest-host polymers of this invention are readily fabricated into electro-optic modular devices using techniques that are generally known in the art.

Embodiments in accordance with the present invention are potentially useful in a number of different possible applications. As previously mentioned, one such application is the preparation of polymer films exhibiting desirable nonlinear optical (NLO) characteristics. Such NLO polymer guest-host systems may be employed as waveguide core materials for electro-optical (EO) devices. Other potential applications include use in Mach Zehnder modulators, optical switches, variable optical attenuators, narrowband notch and bandpass filters, digitally tuned gratings, optical frequency mixers and sensor array antennae.

Specifically, modulator devices fabricated in accordance with embodiments of the present invention may comprise a combination of phase and amplitude modulators formed from high hyperpolarizability guest NLO organic chromophores hosted by an amorphous polycarbonate matrix. In use, a modulator in accordance with an embodiment of the present invention can be configured to perform signal processing.

Figure 4:
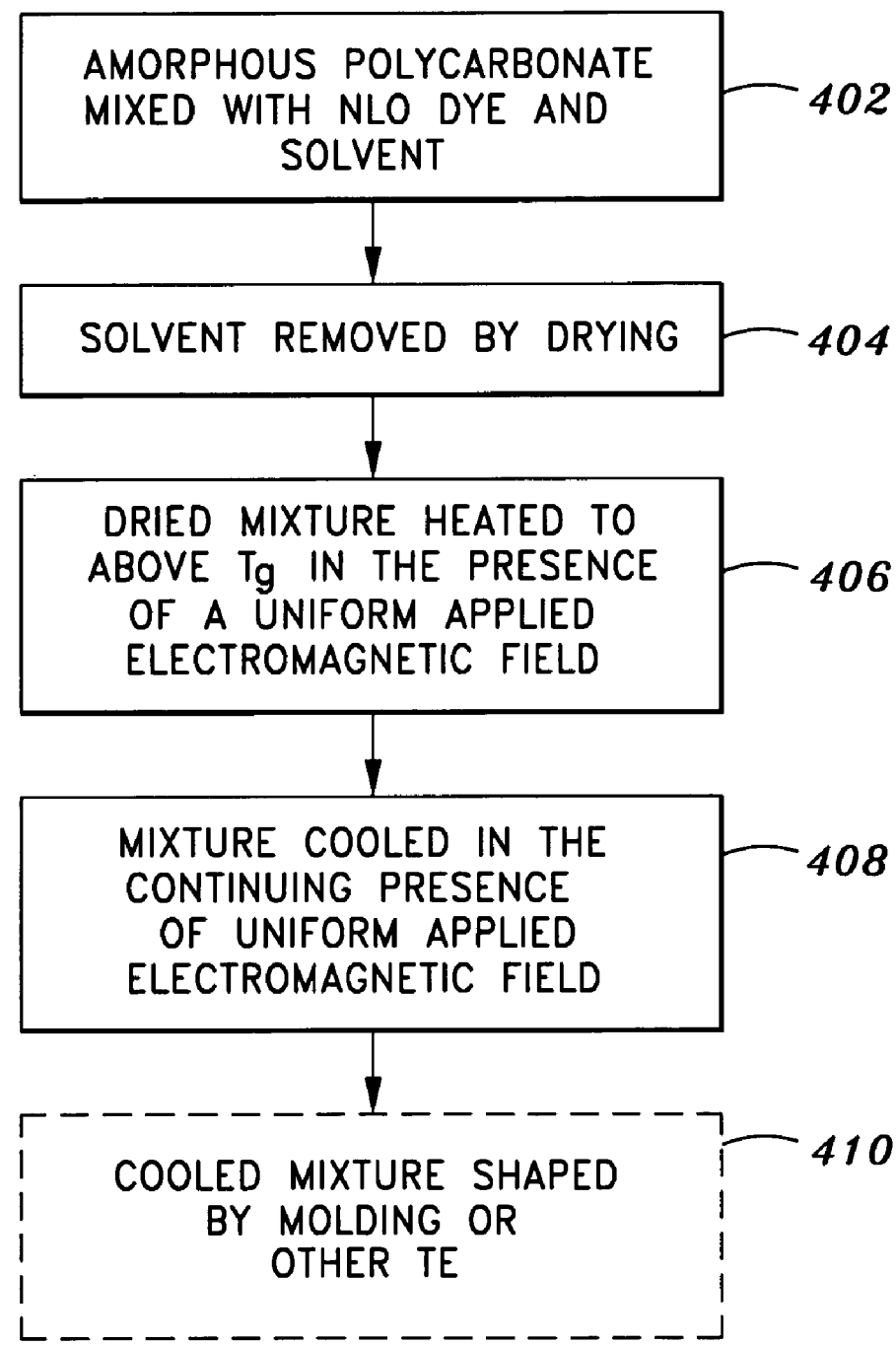
FIG. 4 is a simplified flowchart method steps for forming a guest-host polymer system in accordance with an embodiment of the present invention.

FIG. 4 shows a simplified flow chart showing the steps of one embodiment of a method 400 for preparing a guest/host polymer system exhibiting NLO properties. In first step 402, the amorphous polycarbonate is mixed with the solvent and a NLO dye.

In second step 404, the solvent is removed from the mixture by drying to produce a stable polymer film comprising the NLO chromophore dye distributed at random orientations throughout a non-crosslinked polymer mixture. In third step 406, the dried mixture is heated to above the glass transition temperature of the amorphous polycarbonate and then subjected to an electromagnetic field at a temperature greater than the glass transition temperature of the amorphous polycarbonate to cause poling of the NLO chromophore. In response to application of this electromagnetic field, the orientation of the NLO chromophores distributed throughout the amorphous polycarbonate matrix become uniformly aligned relative to the direction of the applied electromagnetic field.

In fourth step 408, the mixture is cooled with the electric field continuing to be applied, thereby fixing the guest chromophores at uniform orientation within the amorphous polycarbonate host matrix. The guest-host system formed thereby offers temperature stability up to and exceeding 70° C., and thus in an optional subsequent fifth step 410 the guest-host material may be shaped for use in an electro-optical system, utilizing molding or other techniques.

Other applications for the compositions and methods in accordance with the present invention include the fabrication of optoelectrical devices such as Mach Zehnder modulators, optical switches, variable optical attenuators, narrowband notch and bandpass filters, digitally tuned gratings, optical frequency mixers and sensor array antennae in applications where a solvent resistant layer is desirable.

While some of the embodiments of the present invention have been described herein, it should be understood that these are presented by way of example only for these descriptions are not intended to limit the scope of this invention.

For example, many other equivalent or alternative embodiments of the present invention will be apparent to those skilled in the art. While the above description relates to a polymer system utilizing the APEC amorphous polycarbonate, other host materials could also be used and remain within the scope of the present invention.

Figure 9:
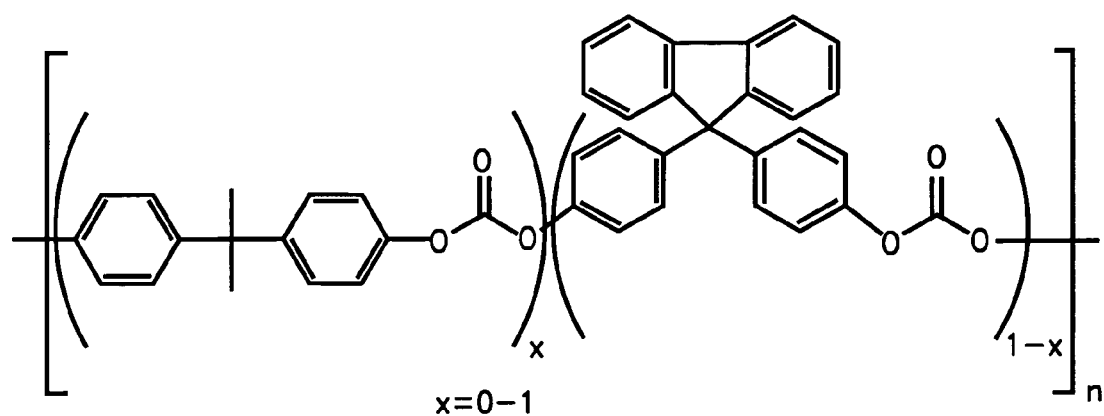
FIG. 9 shows the chemical structure of a host component of a guest-host system in accordance with an alternative embodiment of the present invention.
Figure 10:
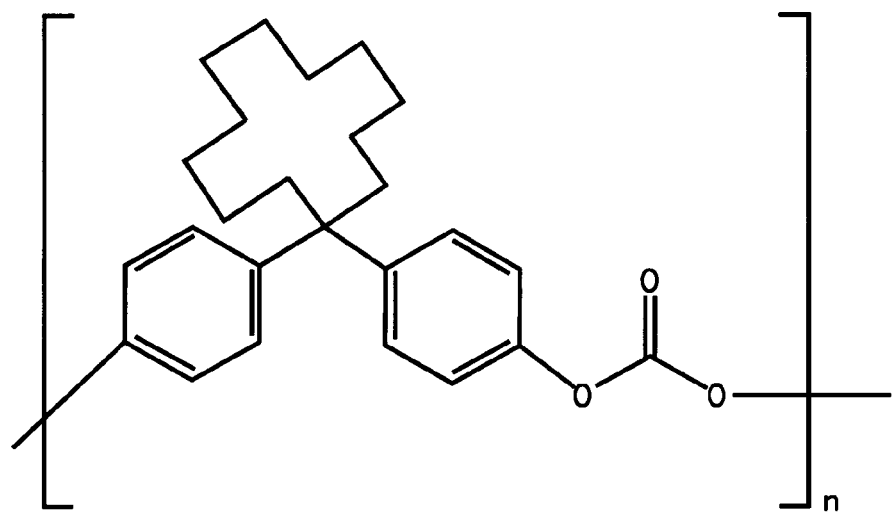
FIG. 10 shows the chemical structure of a host component of a guest-host system in accordance with an alternative embodiment of the present invention.
Figure 11:
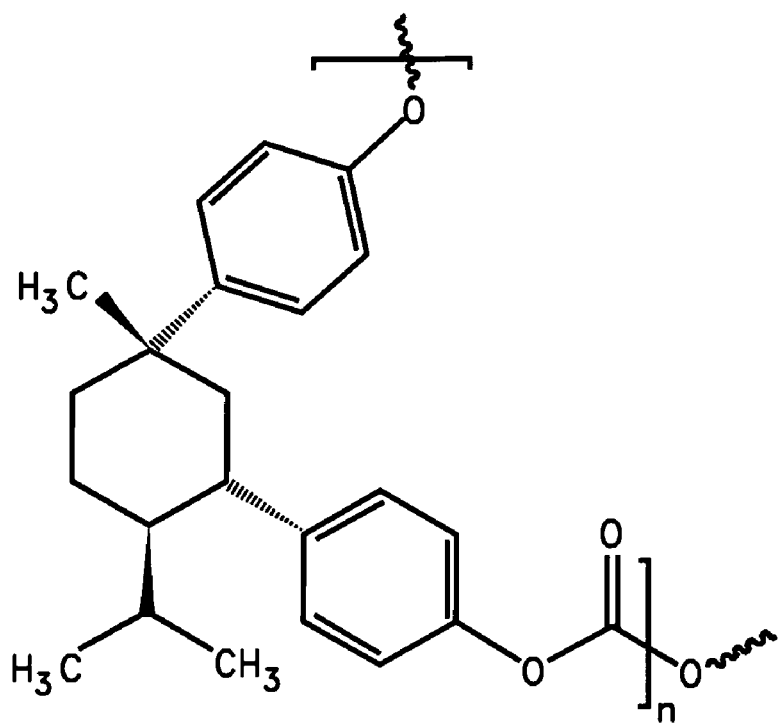
FIG. 11 shows the chemical structure of a host component of a guest-host system in accordance with an alternative embodiment of the present invention.

Examples of alternative polycarbonate host materials having sufficiently high glass transition temperatures and bulky constituents which could also be used include but are not limited to the Bisphenol A-fluorene bisphenol copolymer whose general chemical structure is shown in FIG. 9 (Tg=about 250° C.), and the Red Cross bisphenol carbonate homopolymer whose general chemical structure is shown in FIG. 10 (Tg=about 240° C.), and a terpene-derived bisphenol carbonate having an asymmetric alpha carbon, such as the 1,3-Bis-Hydroxy-Phenyl-Monoterpene polycarbonate whose general chemical structure is shown in FIG. 11 (Tg>about 250° C.), all of which are manufactured by the General Electric Company of Stamford, Conn.

Moreover, host materials for guest-host systems in accordance with embodiments of the present invention are not limited to polycarbonates. Other polymer types exhibiting glass transition temperatures in excess of about 210° C. and including aromatic groups in the polymer backbone may also be used. General categories of some polymer families eligible for use in accordance with embodiments of the present invention include but are not limited to polyamides, polyimides, polyetherimides, polyethylene sulfones, polyethylene ethers, polyethylene ketones, polyesters, acrylics, polyurethanes, epoxies, polyethers, and copolymers of any of the above.

And while the above description relates to a polymer system incorporating the 4B6M NLO chromophore, alternative embodiments in accordance with the present invention may accommodate a variety of other NLO chromophore molecules. One set of examples of guest NLO chromophores which can be incorporated within a host polymer system in accordance with the present invention include tricyanovinyldihydrofuran (FTC) thiophene-bridged and CLD isophorone-bridged aminobenzene chromophores described by L. R. Dalton et al, *Proc. Nat'l Acad. Sci. USA*, Vol. 94, p. 4842 (1997), incorporated by reference in its entirety for all purposes herein.

Other chromophores which can be incorporated into guest host systems in accordance with embodiments of the present invention are described by F. Wang et al., *Polym. Prepr.*, Vol. 39(2), 1065 (1998); and Y. Shi et al., *Science*, Vol. 288, p. 119 (2000), both of which are also incorporated by reference in their entirety for all purposes herein.

He et al., *Chemistry of Materials*, Vol. 14, pp. 4662–4668 (2002), incorporated by reference in its entirety for all purposes herein, report on FTC-related chromophores which may also be incorporated into guest-host systems in accordance with embodiments of the present invention. These FTC-related chromophores may differ from those explicitly described the above references in at least one of the following three respects.

First, an FTC-related chromophore may feature either mono- or ring-substitution of the di-methyl groups on the FTC acceptor with groups including, but not limited to: cyclohexylidene; 4-cyclohexyl-4'-phenyl; 2,4-difluoro-4'-phenyl; 3,4-dichloro-4'-phenyl; 4-butyl-4'-phenyl; pentafluorophenyl; and fluorenone. Second, an FTC-related chromophore may feature conjugation lengths of five instead of three between the aminobenzene and thiophene ring, or may feature a conjugation length of five instead of three between the thiophene ring and tricyanovinyldihydrofuran acceptor. Third, an FTC-related chromophore may feature a regio-specific 3-alkyl-thiophene spacer group in place of the 3,4-dialkyl-thiophene spacer group.

The scope of the invention should be determined with reference to the above description and the appended claims along with their full scope of equivalents.

What is claimed is:

1. An organic chromophore comprising a non-linear optical (NLO) dye in a polymer matrix including a polymer component having an aromatic group as a repeating backbone unit, the polymer component having a glass transition temperature of 210° C. or greater.

2. The organic chromophore of claim 1 comprising a hardened material lattice wave guide structure.

3. The organic chromophore of claim 2 wherein said wave guide structure comprises an electro optical modulator.

4. The organic chromophore of claim 1 wherein said polymer matrix exhibits a projected change in Vpi of less than twice an initial Vpi after ten years at about 60° C. or greater.

5. The organic chromophore of claim 1 wherein said NLO dye is selected from the group consisting of [4-[2-[5-[2-[4-[ethyl-2-methoxyethylamino] phenyl]ethenyl]-3,4-dibutyl-2-thienyl]ethenyl]-3-cyano-5,5-dimethyl-2(5H)-furanylidene] propanedinitrle, [4-[2-[5-[2-[4-[ethyl-2-methoxyethylamino] phenyl]ethenyl]-3,4-dihexyl-2-thienyl]ethenyl]cyano-5,5-dimethyl-2(5H)-furanylidene] propanedinitrile, FTC thiophene-bridged aminobenzene and related chromophores, and CLD isophorone-bridged aminobenzene and related chromophores.

6. The organic chromophore of claim 1 wherein the polymer matrix comprises an amorphous polycarbonate.

7. The organic chromophore of claim 6 wherein said amorphous polycarbonate is selected from the group consisting of amorphous poly[bisphenol A carbonate-co-4,4'-(3,3,5 trimethylcyclohexylidene)diphenol carbonate, fluorene bisphenol copolymer, the Red Cross bisphenol carbonate homopolymer, and 1,3-Bis-Hydroxy-Phenyl-Monoterpene polycarbonate.

8. The organic chromophore of claim 1 configured to function as a device selected from the group consisting of a Mach Zehnder modulator, an optical switch, a varable optical attenuator, a narowband notch and bandpass fiter, a digitally tuned grating, an optical frequency mixer, and a sensor array antenna.

9. A modulator device comprising a combination of phase and amplitude modulators formed from high hyperpolarzability organic chromophores of a non-linear optical (NLO) dye in a polymer matrix including a polymer component having an aromatic group as a repeating backbone unit, the polymer component having a glass transition temperature of 210° C. or greater, said modulator being configured to perform signal processing.

10. The modulator of claim 9 wherein said NLO dye is selected from the group consisting of [4-[2-[5-[2-[4-[ethyl-2-methoxyethylamino]phenyl]ethenyl]-3,4-dibutyl-2-thienyl]ethenyl]-3-cyano-5,5-dimethyl-2(5H)-furanylidene] propanedinitrile, [4-[2-[5-[2-[4-[ethyl-2-methoxyethylamino]phenyl]ethenyl]-3,4-dihexyl-2-thienyl]ethenyl]-3-cyano-5,5-dimethyl-2(5H)-furanylidene] propanedinitrle, FTC thiophene-bridged aminobenzene and related chromophores, and CLD isophorone-bridged aminobenzene and related chromophores.

11. The modulator device of claim 9 wherein the polymer matrix comprises an amorphous polycarbonate.

12. The modulator of claim 11 wherein said amorphous polycarbonate is selected from the group consisting of amorphous poly[bisphenol A carbonate-co-4,4'-(3,3,5-trimethylcyclohexylidene)diphenol carbonate, fluorene bisphenol copolymer, the Red Cross bisphenol carbonate homopolymer, and 1,3-Bis-Hydroxy-Phenyl-Monoterpene polycarbonate.

13. A method of preparing a guest-host system comprising:

mixing a non-linear optical dye with a polymer matrix including a polymer component having an aromatic group as a repeating backbone unit to form a mixture, the polymer component having a glass transition temperature of 210° C. or greater;

heating the mixture above the glass transition temperature while applying a electro-magnetic field to uniformly orient the dye; and cooling the mixture below the glass transition temperature while continuing to apply the electro magnetic field.

14. The method of claim 13 wherein the non-linear optical dye and the polymer matrix are mixed in the presence of a solvent and the solvent is removed at least one of prior to and during the heating.

15. The method of claim 13 wherein mixing the non-linear optical dye comprises mixing a chromophore dye selected from the group consisting of [4-[2-[5-[2-[4-[ethyl-2-methoxyethylamino]phenyl]ethenyl]-3,4-dibutyl-2-thienyl]ethenyl]-3-cyano-5,5-dimethyl-2(5H)-furanylidene] propanedinitrile, [4-[2-[5-[2-[4-[ethyl-2-methoxyethylamino] phenyl]ethenyl]-3,4-dihexyl-2-thienyl]ethenyl]-3-cyano-5,5-dimethyl-2(5H)-furanylidene] propanedinitrile, FTC thiophene-bridged aminobenzene and related chromophores, and CLD isophorone-bridged aminobenzene and related chromophores.

16. The method of claim 13 wherein the polymer matrix comprises an amorphous polycarbonate.

17. The method of claim 13 wherein mixing the amorphous polycarbonate comprises mixing an amorphous polycarbonate selected from the group consisting of amorphous poly[bisphenol A carbonate-co-4,4'-(3,3,5-trimethylcyclohexylidene)diphenol carbonate, fluorene bisphenol copolymer, the Red Cross bisphenol carbonate homopolymer, and 1,3-Bis-Hydroxy-Phenyl-Monoterpene polycarbonate.

18. The method of claim 13 further comprising shaping the mixture to perform as a device selected from the group consisting of a Mach Zehnder modulator, an optical switch, a variable optical attenuator, a narrowband notch and bandpass filter, a digitally tuned grating, an optical frequency mixer, and a sensor array antenna.

* * * * *

UNITED STATES PATENT AND TRADEMARK OFFICE
CERTIFICATE OF CORRECTION

PATENT NO. : 6,978,069 B1
APPLICATION NO. : 10/388364
DATED : December 20, 2005
INVENTOR(S) : Richard R. Barto Jr. et al.

It is certified that error appears in the above-identified patent and that said Letters Patent is hereby corrected as shown below:

In The Claims:

Claim 1, column 7, line 30, the "." after "C" should be deleted;
Claim 4, column 7, line 37, the "." after "C' should be deleted;
Claim 9, column 8, line 3, the "." after "C" should be deleted; and
Claim 13, column 8, line 30, the "." after "C" should be deleted;

Signed and Sealed this

Twenty-fifth Day of July, 2006

JON W. DUDAS
*Director of the United States Patent and Trademark Office*